F. H. KIERSTEAD.
REACTOR AND THE LIKE.
APPLICATION FILED MAR. 27, 1920.

1,412,817.

Patented Apr. 11, 1922.
2 SHEETS—SHEET 1.

Characteristic Curve for Carborundum.

Inventor:
Friend H. Kierstead,
by *Albert G. Davis*
His Attorney.

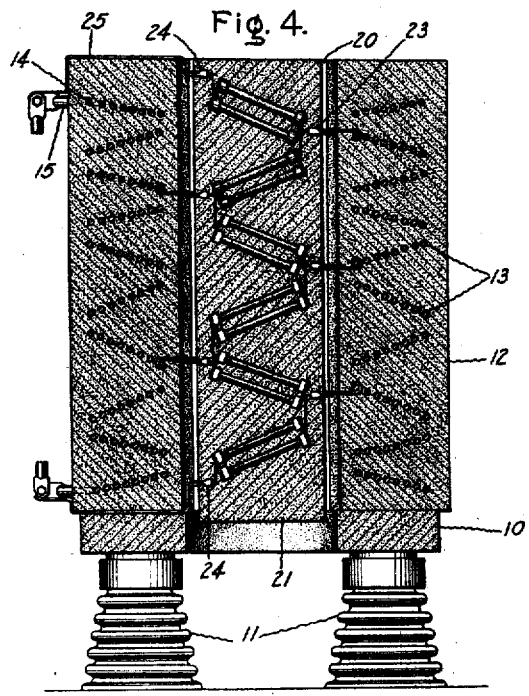

UNITED STATES PATENT OFFICE.

FRIEND H. KIERSTEAD, OF PITTSFIELD, MASSACHUSETTS, ASSIGNOR TO GENERAL ELECTRIC COMPANY, A CORPORATION OF NEW YORK.

REACTOR AND THE LIKE.

1,412,817.  Specification of Letters Patent.  Patented Apr. 11, 1922.

Application filed March 27, 1920. Serial No. 369,329.

*To all whom it may concern:*

Be it known that I, FRIEND H. KIERSTEAD, a citizen of the United States, residing at Pittsfield, in the county of Berkshire, State of Massachusetts, have invented certain new and useful Improvements in Reactors and the like, of which the following is a specification.

My invention relates to reactors and the like, designed to function as protective devices on systems of electrical distribution.

More specifically my invention relates to reactors which not only have a current limiting function but in addition have resistance in shunt with the windings for absorbing the energy of transients.

The general object of my invention is to provide an improved arrangement of parts having high electrical efficiency, and that, at the same time, may be easily and cheaply manufactured.

It is known, as pointed out in the patent to Campos No. 1,018,874, that protective installations having resistance and inductance in series, in order quickly to damp out high frequency transients, should have resistors of high conducivity in shunt with the protected portion of the line in order that the damping coefficient may be large. Shunt resistors to function in this manner, in conjunction with protective reactors, should have high resistance at normal voltages so as to absorb little energy during normal operation but low resistance during the occurrence of transients which induce high voltages in order quickly to absorb the energy of the transients. Carborundum and certain other mixtures of known proportions, as pointed out in Creighton Patent No. 1,317,002, have this so-called negative ampere-volt characteristic. An arrangement for utilizing a material having this characteristic in reactors is shown in this Creighton patent where the plastic supporting the reactor coils is made of such material.

By my invention, however, I am enabled to utilize such material without making the supporting substance or plastic body of the reactor out of such material, since I construct a resistor of material, imparting the desired charasteristic, as a separate entity and adapt the reactor proper to embody such resistor when connected in shunt relation therewith.

Figure 1:
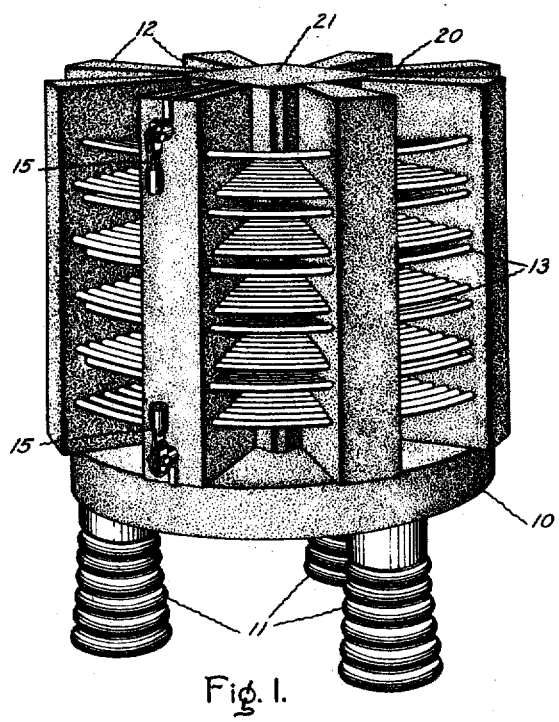
Figure 2:
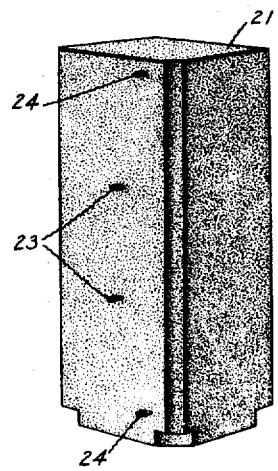
Figure 3:
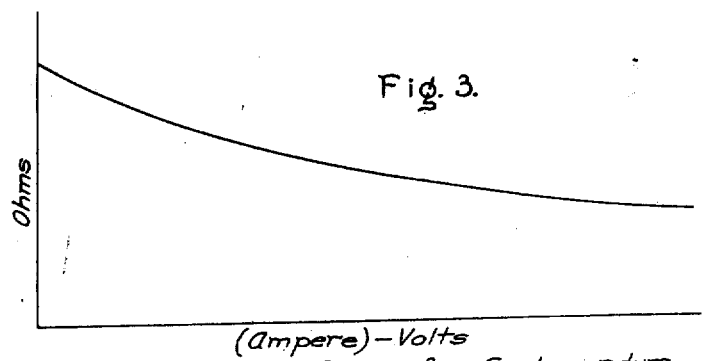

For a more complete understanding of the nature and objects of my invention reference should be had to the following detailed description when taken in connection with the accompanying drawing in which:

Fig. 1 is perspective view of a reactor constructed in accordance with my invention. Fig. 2 is a similar view of the resistor constructed as a separate entity to be embodied in the reactor shown in Fig. 1. Fig. 3 is an explanatory diagram. Figs. 4 and 5 are respectively vertical and horizontal sections of the reactor shown in Fig. 1. And Fig. 6 is a perspective view of the resistance elements embodied in the resistor shown in Fig. 2.

Referring now to the drawings, and particularly to Figs. 1 and 4, 10 represents a base, formed preferably of a plastic such as molded concrete after the manner set forth in Creighton Patent No. 1,317,003.

The base 10 is shown as supported on insulating members 11; the base itself in turn supporting the vertical segmental coil supporting members 12, which are also preferably made of a molded plastic. The members 12 are generally wedge shaped and preferably equidistantly spaced about the periphery of the base 10. These members, when molded or cast as the case may be, are formed to have embedded therein the convolutions 13 of the coiled electrical conductor 14 which is provided with taps 15 for connection to the electric line to be protected.

In the ventilating space 20, centrally of the segmental members 12, I insert the resistor 21 which is a separate unit or entity apart from the reactor proper above described. The resistor may have any suitable form but is here shown as a plastic block in which are embedded resistance elements 22 which have the desired electrical characteristics and are provided with taps 23 in order to be connected at suitable points, as indicated in Fig. 4, with the coils of the reactor proper. The uppermost and lowermost taps 24 are shown as connected directly to the line taps 15 of the reactor.

Resistance elements, such as shown at 22, preferably comprise carborundum rods 30 and are arranged in groups of parallel elements, as shown in Fig. 6, which groups are connected in series. The rods composing a group are conveniently mounted in clips, as shown at 31, conductively related as shown at 32 preparatory to being arranged for being cast in the plastic block composing the resistor.

The resistor unit 21 whose elements are connected in shunt with the turns of the reactor is designed to be a complement of the insulating structure supporting the turns. To this end I have shown its as conveniently supported on the base 10 in nested relation with the reactor proper, but any suitable supporting arrangement may be employed. When composed of carborundum resistance elements the protective reactor operates with a negative ampere-volt characteristic substantially as follows:

During normal operation the value of the shunt resistance is so chosen that it is relatively great, i. e., the normal voltage is on the left hand side of the curve show in Fig. 3, where the value of the resistance is relatively great, consequently very little energy is consumed in the shunt resistance during normal operation. Should a transient occur giving rise to an excessive or resonant voltage in the reactor, the increased voltage attending the phenomenon is accompanied by a decrease in the value of the shunt resistance, as indicated in Fig. 3. The conductivity of the paths in shunt to the line is consequently materially increased and the energy of the transient quickly absorbed.

While I have here shown an embodiment of my invention which is, at present the best means known to me for carrying the same into effect, I would have it understood that this is merely illustrative and that I do not mean to be limited thereby to the precise details here disclosed since obvious alterations thereof will appear to those skilled in this art, nor restricted in the choice of recognized equivalents except as defined in my claims hereunto annexed.

What I claim as new and desire to secure by Letters Patent of the United States, is:—

1. The combination with a reactor, of a resistor comprising a separate unit composed of resistance elements having a negative ampere-volt characteristic and arranged to be connected in shunt with the turns of said reactor, and a connection between the junction of two of said resistance elements and an intermediate portion of said reactor.

2. The combination with a reactor, of a resistor comprising a plastic block embedding resistance elements having a desired electrical characteristic, said elements being provided with taps connecting one of said elements in shunt with one portion of said reactor and another of said elements in shunt with another portion of said reactor.

3. The combination with a reactor having a central ventilating passage, of a resistor comprising a block of plastic material having suitable resistance elements embedded therein, said resistor being located in said central passage and being connected in shunt to the turns of said reactor.

4. The combination with a reactor comprising plastic supporting elements disposed circumferentially of a coiled conductor having its turns embedded in said supporting elements, of a resistor unit comprising a plastic block containing carborundum resistance elements provided with taps on the exterior of the block, said block being arranged to be supported centrally of said supporting elements and having the taps connected to said turns at predetermined points.

5. The combination with a conductor coiled about a hollow space, of an insulating means supporting said conductor, and a resistor unit having one portion of its resistance connected in shunt with one portion of said conductor and another portion of its resistance connected in shunt with another portion of said conductor, said resistor being located in said space surrounded by the conductor to form therewith a unitary protective device.

6. The combination with a coiled conductor, of circumferentially spaced insulating supporting members embedding said conductor, a resistor unit comprising resistance elements connected in shunt with the convolutions of said conductor, and a base supporting said members and said unit in nested relation.

7. The combination with a coiled conductor surrounding a central space, of circumferentially spaced insulating members supporting said conductor, and a resistor unit comprising resistance elements connected in shunt with the convolutions of said conductor and nested within the central space of said conductor to form therewith a unitary protective device.

In witness whereof, I have hereunto set my hand this 25th day of March, 1920.

FRIEND H. KIERSTEAD.